J. R. VICKERY.
VEHICLE WHEEL.
APPLICATION FILED FEB. 10, 1912.

1,154,948.

Patented Sept. 28, 1915.

Witnesses:
S. F. Mann
S. N. Pond

Inventor:
John R. Vickery,
By Offield, Towle, Graves & Offield,
Attys.

UNITED STATES PATENT OFFICE.

JOHN R. VICKERY, OF CHICAGO, ILLINOIS.

VEHICLE-WHEEL.

1,154,948.  Specification of Letters Patent.  Patented Sept. 28, 1915.

Application filed February 10, 1912. Serial No. 676,800.

*To all whom it may concern:*

Be it known that I, JOHN R. VICKERY, a citizen of the United States, residing at Chicago, in the county of Cook and State of Illinois, have invented certain new and useful Improvements in Vehicle-Wheels, of which the following is a specification.

This invention relates to improvements in wheels for automobiles and other vehicles; and has for its main object to provide a practical and economical substitute for the pneumatic tire commonly employed to afford a cushion tread for such wheels.

Substitutes for the usual pneumatic tire comprising, generally, radially movable spring-backed members of various forms mounted within or constituting segments of the rim of the wheel have heretofore been proposed; but, so far as I am aware, such devices have heretofore been too complicated or expensive to prove practical, are difficult to construct and assemble, and are liable to become broken or deranged, especially in travel over rough roadways. My present invention presents a simple and entirely practicable form of spring tire, comparatively easy and simple to construct and assemble, and combining a high degree of strength and rigidity with perfect freedom of the radially movable cushioned tread members.

My invention, its advantages, and its principle of operation will all be readily understood when considered in connection with the accompanying drawing in which I have illustrated one practical embodiment thereof, and in which—

Figure 1:
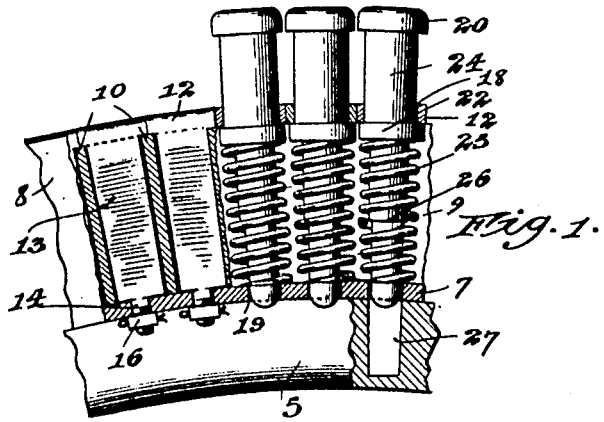
Figure 2:
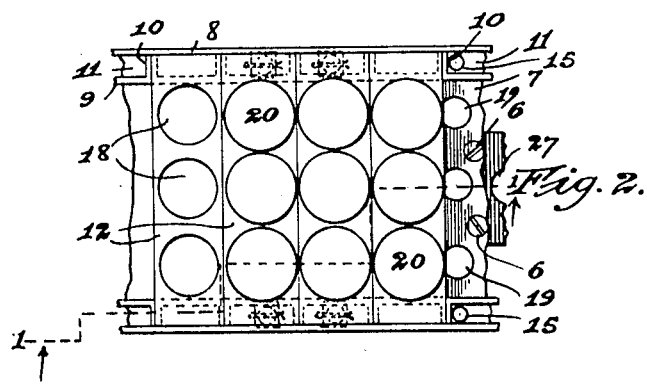
Figure 3:
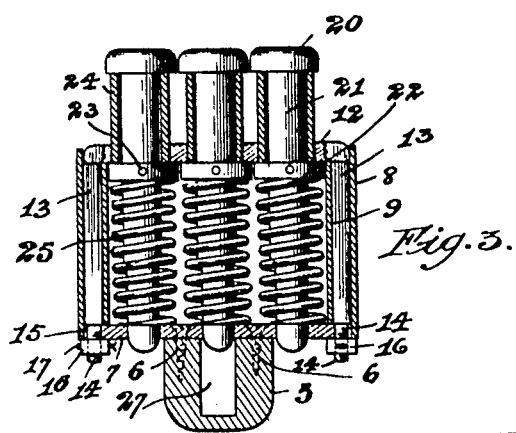

Figure 1 is a side elevation, partly broken out and in vertical section on the line 1—1 of Fig. 2 of a fragment of the tire portion of a wheel embodying my invention. Fig. 2 is a top plan view of Fig. 1 showing the tread surface of the tire. Fig. 3 is a transverse section through the tire structure and felly of my improved wheel.

Referring to the drawing, 5 designates the felly of an ordinary automobile wheel, upon which is secured by any suitable means, such as screws 6, a plain steel band or hoop 7 constituting the inner peripheral member of a hollow rim structure. Each side wall of this hollow rim structure is itself a substantially hollow, radially chambered member comprising outer and inner annular plates 8 and 9, respectively, connected by radial transverse webs or partitions 10, whereby there is formed in each side wall member a series of radial chambers 11 located side by side throughout the entire annular extent of the side wall member. These side wall members, thus formed, are stepped at their inner edges upon the edge portions of the band 7, although the outer walls 8 preferably are carried down so as to overlap the edges of the band 7, as clearly shown in Figs. 1 and 3.

The outer peripheral band of the hollow rim structure is preferably sectional; each section comprising a substantially flat plate 12 that extends transversely of and between the outer edges of the side wall members, resting at its ends upon the inner plates 9 and webs 10 of said side wall members. Integral with the ends of the plates 12 are radial extensions 13 that occupy and fit with comparative snugness the radial chambers 11 of the side walls. These extensions 13 terminate in threaded ends 14 which are passed through holes 15 in the edge portions of the band 7 and are engaged by nuts 16, by which the side and outer peripheral portions of the hollow rim structure are strongly and rigidly secured to the base of inner peripheral portion; the nuts 16 being preferably secured against loosening by cotter pins 17. As will be seen by reference to Figs. 1 and 2, the transversely extending plates 12 which unitedly make up the outer periphery of the hollow rim structure fit snugly edge to edge, and, secured as shown, are practically as effective as a continuous outer band.

Through registering openings 18 and 19 (Fig. 2) extend the stems of a series of spring-pressed plungers, the outer ends of which constitute unitedly the tread portion of the wheel. Each of these plungers, in the preferred form herein shown, comprises a head portion 20, a stem portion 21, a ledge herein shown as a collar 22 secured to the stem 21 as by a cross pin 23, and a sleeve 24 surrounding that portion of the stem lying between the head 20 and the collar 22, said sleeve 24 slidably engaging the hole 18 in the outer periphery of the rim. Surrounding the inner stem portions of the plungers are the cushioning springs 25, herein shown as helical springs confined endwise between the collars 22 and the inner peripheral band 7. The ledges or collars 22 thus constitute abutments for the outer ends of the springs and also stops that coöperate with the outer periphery of the rim to limit the outward movement of the plungers under the thrust of the springs. Each plunger stem is further preferably provided with an annular shoulder 26 (Fig. 1) so placed as to constitute, in coöperation with the inner periphery of the rim, a stop to limit the inward movement of the plunger under load.

I have herein shown a tire tread comprising transverse rows of three plungers each, but it will be understood that the number of plungers and their relative arrangement in the tread is immaterial and optional within the purview of the invention. In an arrangement such as that shown, the stems of the outer plungers of each row lie outside the opposite sides of the felly, while the latter may be provided with a series of central sockets 27 to accommodate the inward movement of the intermediate or central plunger stems.

From the foregoing it will be seen that the inner periphery of the rim is a plain band provided with the necessary apertures; the chambered side walls may be either cast metal structures or built up structures; and the outer peripheral sections are substantially metal yokes easily stamped and bent to form; and all of the parts are capable of being readily assembled and separated. For instance, in case of the breaking of a spring or other injury to one of the sections, the entire section, including the plungers and their springs can be removed by simply removing the nuts 16. The springs, being wholly contained within the hollow or box-like rim are protected from dirt and injury, and the openings in the outer periphery of the rim are at all times occupied and closed by the plunger stems.

While I have shown a practicable and workable embodiment of my invention, it will be evident to those acquainted with the art that the structural details may be varied somewhat without involving any departure from the principles involved, and hence the invention is not confined to the exact embodiment illustrated except to the extent clearly indicated in specific claims.

It will be apparent that the resilient rim structure forming the subject matter of the present invention does not involve any change or modification of the other parts of a standard wheel, beyond the formation of the sockets or chambers 27 of the felly to accommodate the central plunger stems, and that the structure is capable of application to any of the standard forms of wheels now in use.

I claim:

1. In a vehicle wheel, a hollow rim structure comprising an inner peripheral band adapted to be secured to the felly, chambered side walls at their inner edges stepped upon the edge portions of said inner peripheral band, and a sectional outer peripheral band the sections of which have integral radial extensions passing through the chambers of said side walls and secured to said inner peripheral band, in combination with spring-pressed plungers slidably mounted in registering apertures in said peripheral bands and unitedly constituting the tread portion of the wheel.

2. In a vehicle wheel, a hollow rim structure comprising an inner peripheral band adapted to be secured to the felly, chambered side walls at their inner edges stepped upon the edge portions of said inner peripheral band, and a sectional outer peripheral band the sections of which have integral radial extensions occupying the chambers of said side walls and terminating in threaded ends passed through holes in the edge portions of said inner peripheral band, and nuts engaging said threaded ends in combination with spring-pressed plungers slidably mounted in registering apertures in said peripheral bands and unitedly constituting the tread portion of the wheel.

JOHN R. VICKERY.

Witnesses:
 SAMUEL N. POND,
 DAISY C. THORSEN.

Copies of this patent may be obtained for five cents each, by addressing the "Commissioner of Patents, Washington, D. C."